(12) United States Patent
Rathjen et al.

(10) Patent No.: US 9,455,541 B2
(45) Date of Patent: *Sep. 27, 2016

(54) RECESSED MOVABLE JAWS FOR CONNECTING A PLUG-IN UNIT TO A BUSWAY

(71) Applicant: SCHNEIDER ELECTRIC IT CORPORATION, West Kingston, RI (US)

(72) Inventors: Jonathan H. Rathjen, High Ridge, MO (US); Malee Alway, Wentzville, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/574,977

(22) Filed: Dec. 18, 2014

(65) Prior Publication Data

US 2016/0181749 A1    Jun. 23, 2016

(51) Int. Cl.
| | |
|---|---|
| *H01R 13/02* | (2006.01) |
| *H01R 25/16* | (2006.01) |
| *H01R 25/14* | (2006.01) |
| *H02G 5/08* | (2006.01) |
| *H01R 43/20* | (2006.01) |

(52) U.S. Cl.
CPC .......... *H01R 25/162* (2013.01); *H01R 25/142* (2013.01); *H01R 43/20* (2013.01); *H02G 5/08* (2013.01)

(58) Field of Classification Search
CPC ........................... H01R 25/162; H01R 25/003
USPC ........... 439/215, 654, 440, 49, 211, 92, 170, 439/222, 640, 535, 557
See application file for complete search history.

(56) References Cited

U.S. PATENT DOCUMENTS

| | | |
|---|---|---|
| 2,825,775 A | 3/1958 | Constantine et al. |
| 2,861,139 A | 11/1958 | Platz et al. |

(Continued)

FOREIGN PATENT DOCUMENTS

EP    2940818 A1    11/2015

OTHER PUBLICATIONS

Extended European Search Report from corresponding European Application No. 15200859.5 dated Apr. 19, 2016.

*Primary Examiner* — Phuongchi T Nguyen
(74) *Attorney, Agent, or Firm* — Lando & Anastasi, LLP

(57) ABSTRACT

A plug-in unit configured to be coupled to a busway includes a housing configured to be secured to the busway, an electrical coupling assembly coupled to the housing and configured to move between an uncoupled position in which the plug-in unit is uncoupled to the busway and a coupled position in which the plug-in unit is electrically coupled to the busway, and an actuator assembly coupled to the housing and the electrical coupling assembly. The actuator assembly is configured to move the electrical coupling assembly between the uncoupled and coupled positions and to secure the plug-in unit to the housing. Other embodiments of the plug-in unit and a method of securing a plug-in unit to a busway are further disclosed.

17 Claims, 9 Drawing Sheets

(56) References Cited

U.S. PATENT DOCUMENTS

| | | |
|---|---|---|
| 2,902,555 A | 9/1959 | Herrmann |
| 2,903,503 A | 9/1959 | Carlson et al. |
| 2,970,245 A | 1/1961 | Weimer et al. |
| 3,716,683 A | 2/1973 | Hafer |
| 5,340,326 A * | 8/1994 | LeMaster ............... H01R 25/00 439/207 |
| 8,444,425 B2 * | 5/2013 | Byrne .................... H01R 4/185 439/215 |
| 2006/0052009 A1 * | 3/2006 | Johnson ............... H01R 12/592 439/660 |
| 2009/0239402 A1 * | 9/2009 | Byrne .................... H01R 25/00 439/215 |
| 2010/0190369 A1 * | 7/2010 | Byrne .................... H01R 4/185 439/215 |

* cited by examiner

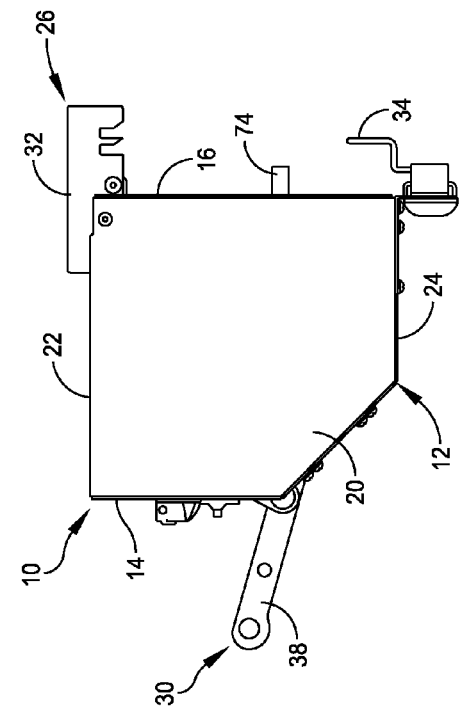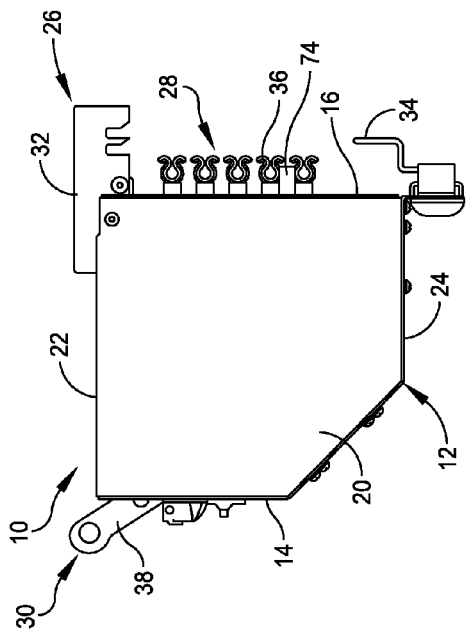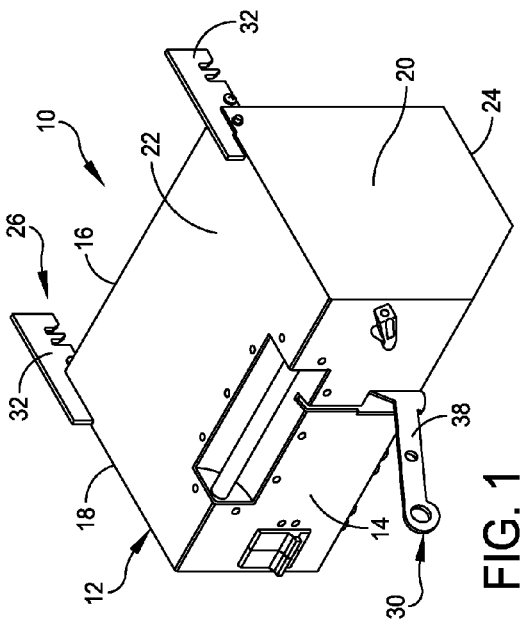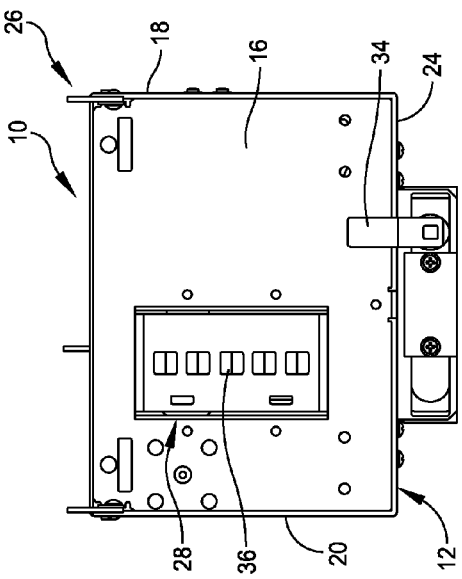

RECESSED MOVABLE JAWS FOR CONNECTING A PLUG-IN UNIT TO A BUSWAY

RELATED APPLICATION

This application relates to U.S. patent application Ser. No. 14/574,965 entitled INTERFACE APPARATUS AND METHOD FOR CONNECTING PLUG-IN UNITS TO A BUSWAY, by Daniel J. Rohr, Jonathan H. Rathjen, and Malee Alway, filed on even date herewith and incorporated herein by reference.

BACKGROUND OF DISCLOSURE

1. Field of Disclosure

This disclosure is directed to busways used in data centers, and more particularly to a busway plug-in unit having recessed movable jaws for connecting the plug-in unit to a busway without having to power down ("off") the busway, and to a method of installing, removing and replacing the plug-in unit on the busway.

2. Discussion of Related Art

Busway electrical distribution systems are well known in the art of electrical distribution. Busway systems are comprised of a number of factory assembled sections, each including a number of individually insulated generally flat electrical conductors or busbars stacked one upon another and enclosed within a housing which provides protection and support for the busbars. For example, typical powerbus busway systems have ten-foot (or four-foot) sections of flat, stacked, electrical conductors for transporting electrical energy from a point A to a point B, while distributing the electrical energy to various electrical loads. Busway construction is modular, and, in many ways, is superior to cable and conduit systems from an installation standpoint.

For distribution of the electrical energy, the busway sections include one or more plug-in outlets having a plurality of conductive contact points on the internal busbars. In general, the plug-in outlets include openings that are provided through the housing of the busway system at each of a plurality of power tap-off sections to expose conductive material of the busbars for connection with an appropriate connecting jaw. A plug-in unit, which is used to tap off power from the busway, is attached to the plug-in opening by mounting a plurality of jaws to the respective busbars.

When adding, removing or replacing the plug-in unit to and from the busway, it is advised or sometimes required to power down the busway prior to performing one of these functions. As busways are used increasingly within data centers, the requirement to have to first power down the powerbus busway before making any changes to the plug-in unit population is somewhat onerous, since powering down the powerbus busway means a portion of the data center is down for operation. The temptation may exist to ignore this requirement and perform "live work" by "hot swapping" the plug-in unit.

One approach used to prevent the temptation of not powering down the busway is to place numerous warning labels on the equipment and within the installation manual associated with the plug-in unit. Such warnings encourage the person installing the plug-in unit to first power down the powerbus busway before making any changes. A disadvantage associated with this approach is that "hot swapping" still occurs despite the warnings due to the installer's desire to maintain a high level of uptime in the data center.

Another approach is for the installer or operator to have two separate feeds, and to employ one feed when powering down the other feed. A disadvantage associated with this approach is that there is no redundancy when one feed is powered down.

SUMMARY OF DISCLOSURE

One aspect of the disclosure is directed to a plug-in unit configured to be coupled to a busway. In one embodiment, the plug-in unit comprises a housing configured to be secured to the busway, an electrical coupling assembly coupled to the housing and configured to move between an uncoupled position in which the plug-in unit is uncoupled to the busway and a coupled position in which the plug-in unit is electrically coupled to the busway, and an actuator assembly coupled to the housing and the electrical coupling assembly. The actuator assembly is configured to move the electrical coupling assembly between the uncoupled and coupled positions and to secure the plug-in unit to the housing.

Embodiments of the plug-in unit further may include a spring-loaded pin configured to prevent the electrical coupling assembly from moving to the coupled position when the spring-loaded pin is extended. The plug-in unit further may comprise a mechanical coupling assembly coupled to the housing and configured to releasably secure the housing to the busway. The mechanical coupling assembly may include a bracket configured to engage a top of the busway. The actuator assembly may include a lever coupled to the housing and the electrical coupling assembly. The lever is movable between a first position in which the electrical coupling assembly is in the uncoupled position and a second position in which the electrical coupling assembly is in the coupled position. The electrical coupling assembly may include jaws configured to engage the busway. The jaws may be coupled to the lever, with the jaws being movable by the lever when moving the lever from the first position in which the jaws achieve a disengaged position associated with the uncoupled position of the electrical coupling assembly with the jaws being spaced from the busway to the second position in which the jaws achieve an engaged position associated with the coupled position of the electrical coupling assembly with the jaws engaging the busway. The electrical coupling assembly may include a guide mounted on the housing and a jaws housing that is movably coupled to the guide, with the jaws being mounted on the jaws housing. The guide may include two side walls, each side wall having at least one slot formed therein to guide the movement of posts mounted on the jaws housing. The actuator assembly further may include a lever fork coupled to the jaws housing, and a lever link coupled to the lever and the lever fork.

Another aspect of the disclosure is directed to a method of securing a plug-in unit to a busway. In one embodiment, the method comprises: securing a housing of the plug-in unit to the busway; and selectively electrically coupling the plug-in unit to the busway by an electrical coupling assembly coupled to the housing and configured to move between an uncoupled position in which the plug-in unit is uncoupled to the busway and a coupled position in which the plug-in unit is electrically coupled to the busway.

Embodiments of the method further may include moving a lever associated with the housing between a first position in which the electrical coupling assembly is in the uncoupled position and a second position in which the electrical coupling assembly is in the coupled position. The method further may include moving jaws of the plug-in unit coupled to the lever when moving the lever from the first position in which the jaws achieve a disengaged position associated with the uncoupled position of the electrical coupling assembly with the jaws being spaced from the busway to the second position in which the jaws achieve an engaged position associated with the coupled position of the electrical coupling assembly with the jaws engaging the busway.

Yet another aspect of the disclosure is directed to plug-in unit comprising a housing configured to mate with the busway, a plug-in interface coupled to the housing, the plug-in interface being configured to receive a plug-in unit, means for electrically coupling the plug-in unit to the busway between an uncoupled position in which the plug-in interface is uncoupled to the busway and a coupled position in which the plug-in interface is electrically coupled to the busway, and means for actuating the movement of the electrical coupling means between the uncoupled and coupled positions.

The means for actuating the movement of the electrical coupling means may include a lever coupled to the housing and movable between a first position in which electrical coupling means is in the uncoupled position and a second position in which the electrical coupling means is in the coupled position. The means for electrical coupling includes jaws configured to engage the busway. The jaws may be coupled to the lever, with the jaws being movable by the lever when moving the lever from the first position in which the jaws achieve a disengaged position associated with the uncoupled position of the electrical coupling assembly with the jaws being spaced from the busway to the second position in which the jaws achieve an engaged position associated with the coupled position of the electrical coupling assembly with the jaws engaging the busway. The means for electrical coupling further may include a guide mounted on the housing and a jaws housing that is movably coupled to the guide, the jaws being mounted on the jaws housing. The guide may include two side walls, with each side wall having at least one slot formed therein to guide the movement of posts mounted on the jaws housing. The means for actuating further may include a lever fork coupled to the jaws housing, and a lever link coupled to the lever and the lever fork.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 is a perspective view of a plug-in unit of an embodiment of the present disclosure, the plug-in unit having movable jaws shown in a retracted position;

FIG. 2 is a side view of the plug-in unit;

FIG. 3 is a rear view of the plug-in unit;

FIG. 4 is a side view of the plug-in unit showing the movable jaws in an extended position;

DETAILED DESCRIPTION

Figure 5:
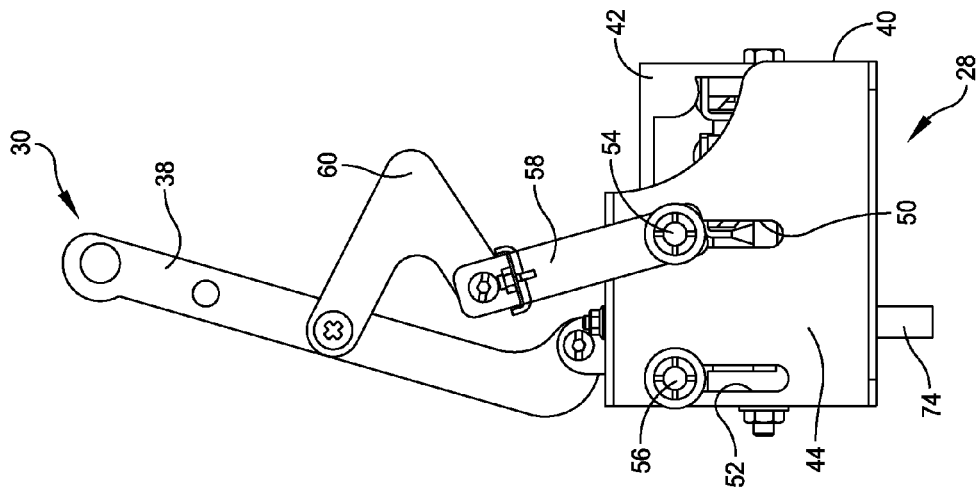
FIG. 5 is a perspective view of a jaws movement mechanism.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Busways may be used to provide power to modules positioned within configurable racks located within the data center. Busways are used in many electrical power distribution devices, such as power modules, switching apparatus, distribution apparatus, and batteries. As mentioned above, it is advised or sometimes required to power down the busway prior to adding, removing or replacing a plug-in unit to and from the busway. Existing powerbus busways are sold primarily into factory or warehouse locations where they are less critical to power down the busway when changing the population of the plug-in units. In this environment, there is little impetus to develop a mechanism that enables plug-in units to be mechanically and electrically secured to the busway in a hot swappable manner. However, as mentioned above, the electronic equipment housed within the data center oftentimes perform critical tasks. In such instances, it is very desirable to avoid powering down the busways. The plug-in unit of embodiments of the present disclosure enables the operator of the data center to incorporate the plug-in units on the busways of the data center to allow for adding or replacing plug-in units when the busway is powered on.

A plug-in unit of embodiments of the present disclosure enables operators of data centers to install, remove and replace plug-in units without having to power down a busway. By switching the plug-in unit to an "off" position, the operator can secure the plug-in unit on the busways without having to power down the busway. Once installed, the operator switches the plug-in unit to an "on" position in which power is provided to the plug-in unit. Advantages of the plug-in unit include, but are not limited to, isolating live electrical conductors from the person installing the plug-in unit, securing an arc blast barrier to further protect the person installing the plug-in unit, ensuring a complete, well-grounded enclosure to conduct any arc blast to ground prior to making any other connection, and mechanically securing the plug-in unit to the busway to prevent removal of the plug-in unit while powered by the busway. Thus, critical loads within the data center, e.g., servers, can remain powered "on" even when making changes to the population of the plug-in units, as long as the plug-in unit is installed in an "off" position.

In one embodiment, an actuator handle or lever on a side or front of a housing of the plug-in unit is configured to apply power to the plug-in unit from the busway. When the lever is raised, the lever moves jaws of the plug-in unit into contact with the busbars and by doing so applies power to the plug-in unit. When in this position, the plug-in unit is secured to the busway and prevented from being removed from the busway.

A plug-in unit of embodiments of the present disclosure can be configured as a one-, two-, three-, four-, or five-pole internal manual disconnect switch to allow an operator to install, remove or replace a plug-in unit on a "live" busway. The handle or lever of the plug-in unit is provided to enable electrical connection as described above. A back of the housing of the plug-in unit has jaws that connect to busbars located inside the busway.

Referring to the drawings, and more particularly to FIGS. 1-4, a plug-in unit is generally indicated at 10. In one embodiment, the plug-in unit 10 is configured to be mounted on or otherwise secured to a busway. As will be described in greater detail below with reference to the drawings, the plug-in unit 10 enables operators of data centers to install, remove and replace the plug-in units without having to power down the busway. By switching the plug-in unit 10 to an "off" position, the operator can install the plug-in unit, for example, without having power down the busway. Once installed, the operator switches the plug-in unit 10 to an "on" position in which power is provided to the plug-in unit by the busway.

The plug-in unit 10 of embodiments of the present disclosure includes a housing generally indicated at 12, which is sized and shaped to house the internal components of the plug-in unit, including a circuit breaker or fusible disconnect assembly. As shown, the housing 12 of the plug-in unit 10 includes a front wall 14, a back wall 16, side walls 18, 20, a top wall 22 and a bottom wall 24. The housing 12 of the plug-in unit 10 can be fabricated from sheet metal or some other suitable alloy or material that is capable of supporting the components of the plug-in unit.

The plug-in unit 10 also includes a mechanical coupling assembly generally indicated at 26, which is provided at the back of the housing 12 and configured to mechanically secure the top of the housing of the plug-in unit to the busway. The plug-in unit 10 further includes an electrical coupling assembly generally indicated at 28, which is provided at the back of the housing 12 and configured to electrically secure the plug-in unit to the busway. Specifically, the electrical coupling assembly 28 is configured to move back and forth between a retracted, uncoupled position in which the electrical coupling assembly is uncoupled to the busway and an extended, coupled position in which the plug-in unit is electrically coupled to the busway. The plug-in unit 10 further includes an actuator assembly generally indicated at 30, which is provided at the front of the housing 12 and the electrical coupling assembly 28, and configured to move the electrical coupling assembly between its retracted, uncoupled and extended, coupled positions. The arrangement is that the actuator assembly 30 controls the electrical connection of the plug-in unit 10 to the busway.

In the shown embodiment, the mechanical coupling assembly 26 includes two mounting brackets, each indicated at 32, which are secured to respective side walls 18, 20 of the housing 12 of the plug-in unit 10. As shown, the mounting brackets 32 are secured to the upper portions of the side walls 18, 20 and extend beyond a plane defined by the back wall 16 of the housing 12. Each mounting bracket 32 includes one or more notches formed therein to hang the mounting bracket and the housing 12 of the plug-in unit on the busway. The mounting brackets 32 may be specifically configured to engage the busway depending on the type and size of busway being used. As shown, the mechanical coupling assembly 26 further includes a bracket 34, which is mounted on the housing 12 at the corner of the back wall 16 and the bottom wall 24 of the housing. As shown, the bracket 34 is configured to secure the bottom of the housing 12 to the busway.

In one embodiment, the electrical coupling assembly 28 includes movable electrical jaws 36, which correspond to contact points on internal busbars provided on the busway. The movable electric jaws 36 are configured to move between a disengaged position in which the movable electrical jaws are retracted within the housing 12 of the plug-in unit 10 and an engaged position in which the movable electrical jaws are extended from the housing to engage the contact points on the internal busbars of the busway to provide an electrical connection between the busway and the plug-in unit. The manner in which the movable electrical jaws 36 are moved between their disengaged (retracted) and engaged (extended) positions will be described in greater detail when the actuator assembly is described.

The actuator assembly 30 includes a switch or lever 38, which is positioned at the front of the housing 12 of the plug-in unit 10. The lever 38 is movable between two positions, a lower or "off" (retracted) position shown in FIG. 1 and an upper or "on" (extended) position shown in FIG. 4. To complete the electrical connection of the plug-in unit 10 to the busway, the lever 38 is mechanically coupled to the movable electrical jaws 36 to move the jaws between the disengaged (retracted) position illustrated in FIG. 1 and the engaged (extended) position illustrated in FIG. 4. The lever 38 is rotated or moved upwardly to the upper position in which the movable electrical jaws 36 are extended to engage contact points on the internal busbars provided on the busway. This is referred to as the "on" position. To move back to the "off" position, the lever 38 is rotated or moved downwardly to the lower position, and the movable electric jaws 36 are retracted from contact points on the internal busbars of the busway with the result of the movable electric jaws being stowed inside the housing 12 of the plug-in unit 10. Electrical connection between the plug-in unit 10 and the busway is broken during this time.

Figure 6:
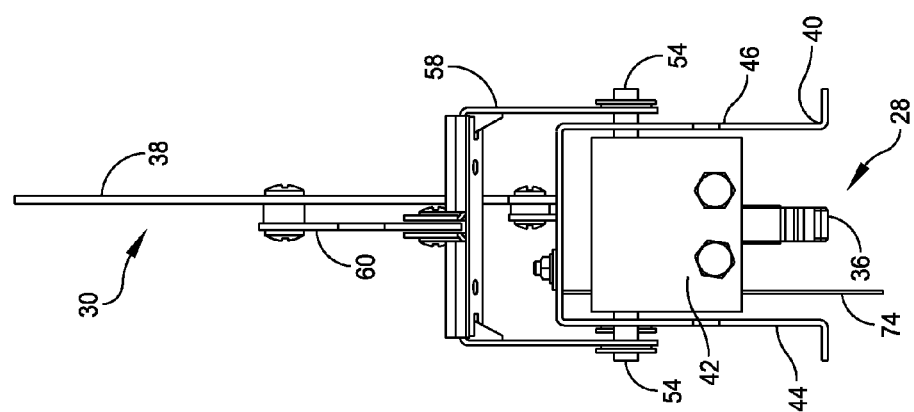
FIG. 6 is a front view of the jaws movement mechanism.
Figure 7:
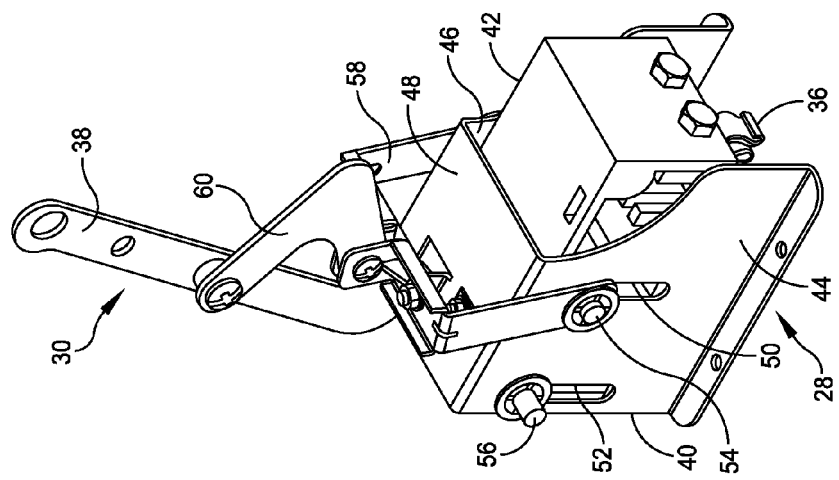
FIG. 7 is a side view of the jaws movement mechanism.

Referring to FIGS. 5-7, the electrical coupling assembly 28 and the actuator assembly 30 is shown apart from the housing 12 of the plug-in unit 10. Although separately described, the electrical coupling assembly 28 and the actuator assembly 30 together form an integrated unit that is positioned within the housing 12 of the plug-in unit 10 and may be referred to as a jaws movement mechanism or a linkage mechanism. As shown, the electrical coupling assembly 28 includes a guide 40 that is mounted on the housing 12 of the plug-in unit 10. The electrical coupling assembly 28 further includes a jaws housing 42 that is movably coupled to the guide 40. As shown, the jaws 36 are mounted on the jaws housing 42 and are moved when the jaws housing is moved. As shown, the guide 40 includes two side walls 44, 46 connected to one another by a top wall 48 to form a generally U-shaped structure. FIGS. 5 and 7 illustrate the side wall 44 having two slots 50, 52 formed therein to guide the movement of respective posts 54, 56 received therein. The posts 54, 56 are mounted on the jaws housing 42. It should be noted that the other side wall 46 includes a corresponding slot formed therein, with one post mounted on the jaws housing 42 that is received within the slots. FIG. 6 illustrates post 54 provided on the other side of the jaws housing 42. The arrangement is such that the posts extend through the slots of the side walls of the guide 40 and are movable within the slots to guide the up-and-down movement of the jaws housing 42 within the guide as shown.

The actuator assembly 30 includes the lever 38, which is designed to be operated by grabbing and rotating the lever in a clockwise direction as shown in FIG. 7. As shown, the lever 38 is pivotally secured to the top wall 48 of the guide 40. The actuator assembly 30 further includes a lever fork 58 pivotally connected to one set of posts, e.g., post 54, and a lever link 60, which pivotally connects the lever 38 to the lever fork. The arrangement is such that when the lever 38 is rotated, the lever drives the linear movement of the lever link 60, the lever fork 58 and the jaws housing 42 to move the jaw housing and the jaws 36 downward with respect to the guide 40 as shown in FIG. 7. The other post, e.g., post 56, assists in guiding the movement of the jaws housing 42 with respect to the guide 40. When rotated, the jaws 36 extend from the guide 40 and the housing 12 to be electrically connected to the busway.

Figure 8:
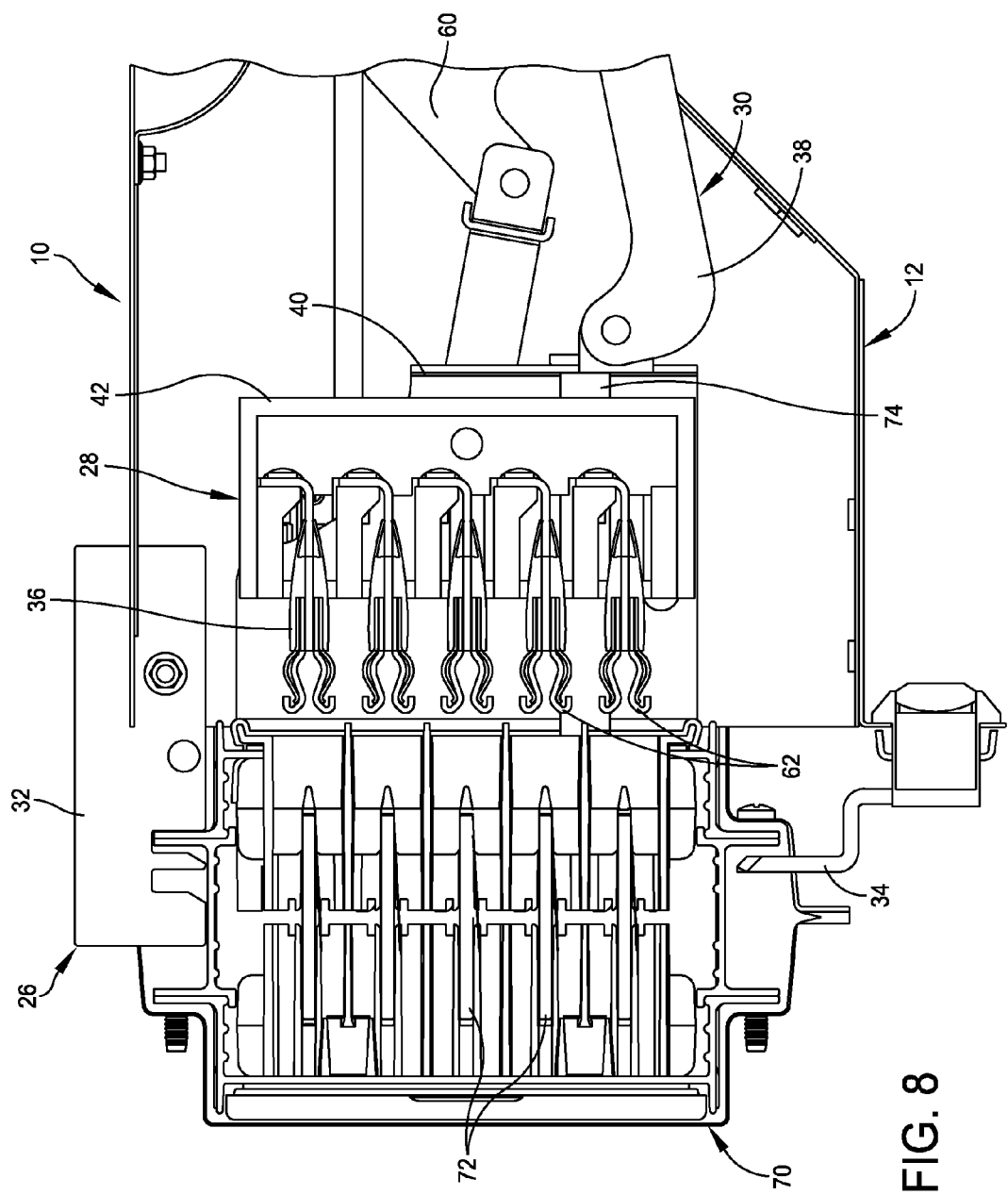
FIG. 8 is a cross-sectional view of the plug-in unit secured to a busway showing the movable jaws in the retracted position.

The operation of the plug-in unit 10 will be further described with reference to FIGS. 8 and 9. FIG. 8 illustrates the plug-in unit mounted on a busway generally indicated at 70. The busway 70 includes several busbars, each indicated at 72, which lie along a generally horizontal plane as shown. As shown, the jaws 36 of the plug-in unit 10 are aligned so that prongs, each indicated at 62, of the jaws are aligned with the busbars 72 to receive the busbars therein. The mounting brackets 32 and the bracket 34 are suitably secured to the busway 70 so that the jaws 36 achieve the required alignment with the busbars 72. The jaws 36 are shown in the disengaged position in which the jaws are retracted within the housing 12 of the plug-in unit 10.

In one embodiment, an alignment pin 74, secured to the jaws housing 42 and extends from a back 16 of the housing 12, is provided to guide the jaw assembly and the jaws into a proper area of the busway, by entering a corresponding opening in a socket of the busway when the plug-in unit 10 is attached to the busway and rotated into position. The alignment pin ensures that the jaws contact the busbars properly when extended.

Figure 9:
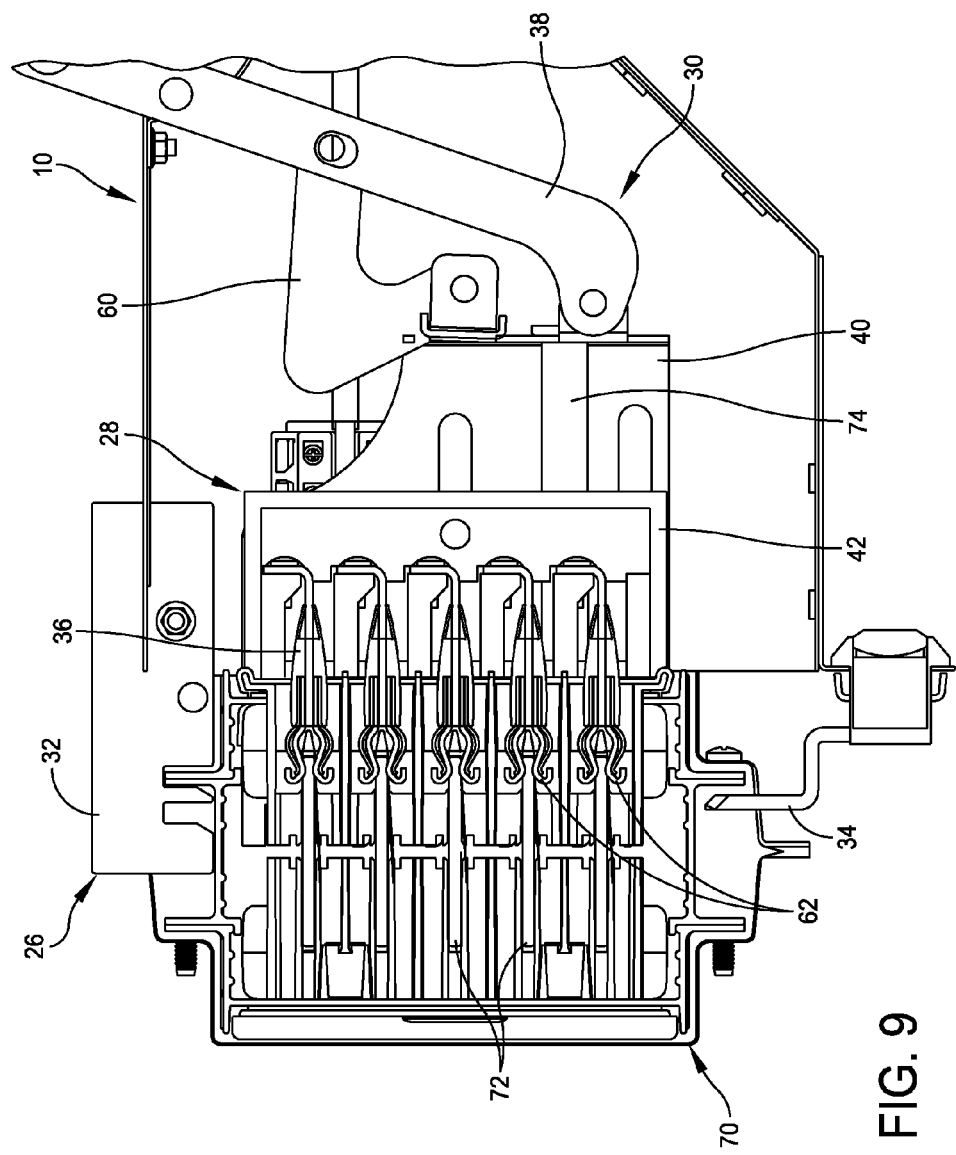
FIG. 9 is a cross-sectional view of the plug-in unit secured to the busway showing the movable jaws in the extended position.

FIG. 9 illustrates the jaws 36 in the engaged position in which the jaws are extended from the housing 12 to engage the contact points on the busbars 72 of the busway 70 to provide an electrical connection between the busway and the plug-in unit 10. In this position, the plug-in unit is powered by the busway 70. As described above, the plug-in unit can power any type of device, including servers, power modules, switching apparatus, distribution apparatus, and batteries.

Figure 10:
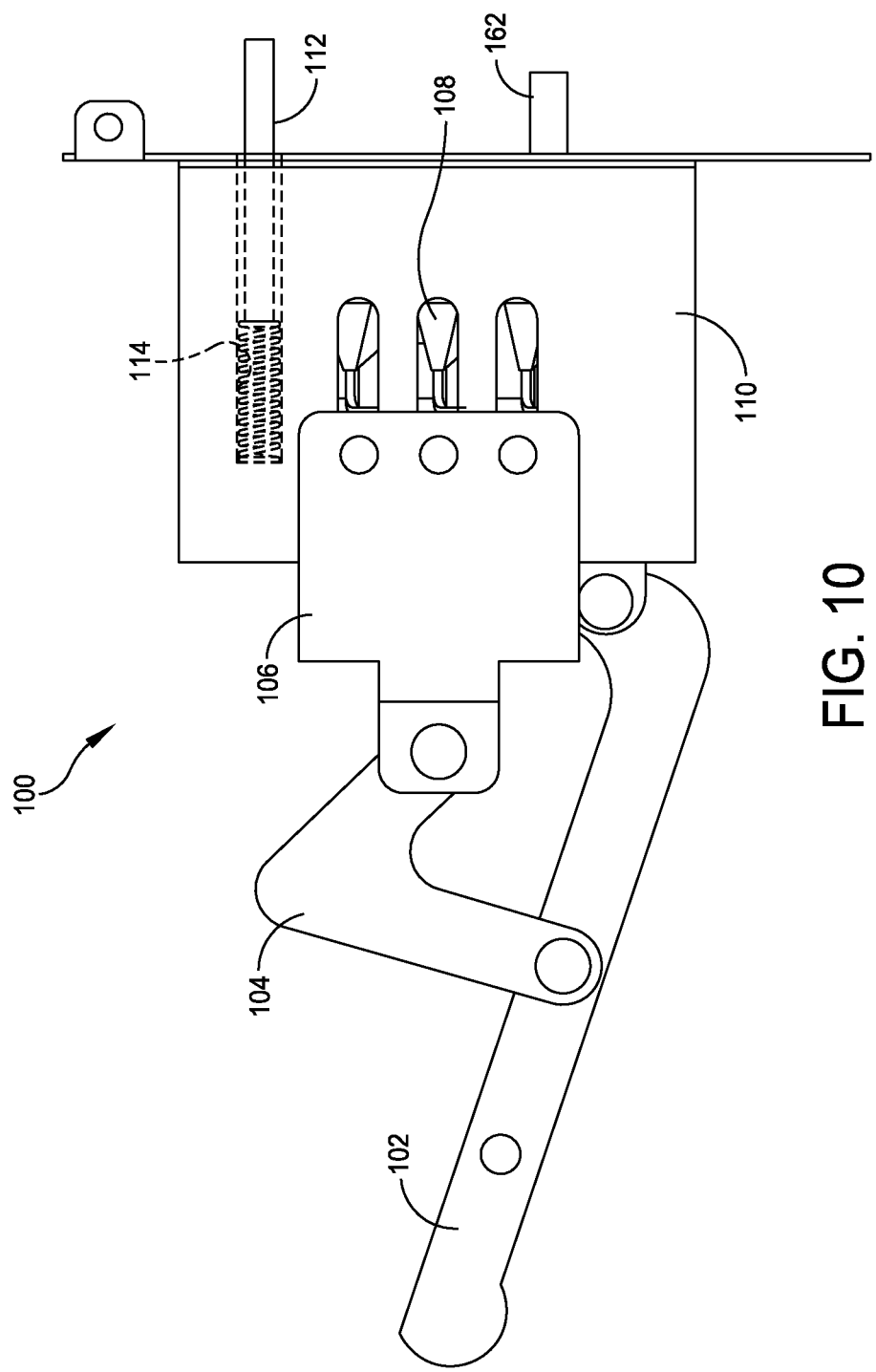
FIG. 10 is a schematic side view of a jaws movement mechanism of a plug-in unit of another embodiment of the present disclosure.

FIG. 10 illustrates a jaws movement mechanism, generally indicated at 100, of a plug-in unit of another embodiment of the present disclosure. As shown, the jaws movement mechanism 100 includes a lever 102, a lever link 104 and a lever fork 106, which together to drive the back-and-forth movement of movable jaws 108 provided within a guide housing 110. The arrangement is such that the jaws movement mechanism 100 is configured to move the jaws 108 between its shown retracted position and an extended position in which the lever 102 is moved clockwise to extend the jaws. The jaws movement mechanism 100 further includes two spring-loaded interlock pins 112 that are housed within respective sleeves 114 provided in the guide housing 110 to prevent the extension of the jaws 108 when the plug-in unit is not secured or insufficiently secured to a busway, with one of the spring-loaded interlock pins being shown in FIG. 10. In one embodiment, the spring-loaded interlock pins 112 and their respective sleeves 114 are spaced apart from one another with the movable jaws 108 being positioned between them. It should be noted that only one spring-loaded interlock pin may be provided to provide the interlock feature described herein.

When the plug-in unit is not secured to the busway, and the spring-loaded interlock pins 112 are extended and the jaws 108 are fully retracted, the jaws movement mechanism 100 remains locked with the jaws in the retracted position as long as the pins remain in an extended position. When the plug-in unit is secured or otherwise hooked onto a top of a busway, and an installer begins to rotate the plug-in unit into a fully secured position, the spring-loaded interlock pins 112 contact an outer surface of the busway and are received within their respective sleeves 114. As the plug-in unit is rotated and pushed against the busway, the pins 112 are pushed into the plug-in unit until the pins are fully retracted with the sleeves 114. When the spring-loaded interlock pins 112 have been pushed into the plug-in unit until fully inside the sleeves 114 of the guide housing 110, the interlock will release, and the jaws 108 will be allowed to extend by movement of the jaws movement mechanism 100.

Figure 11:
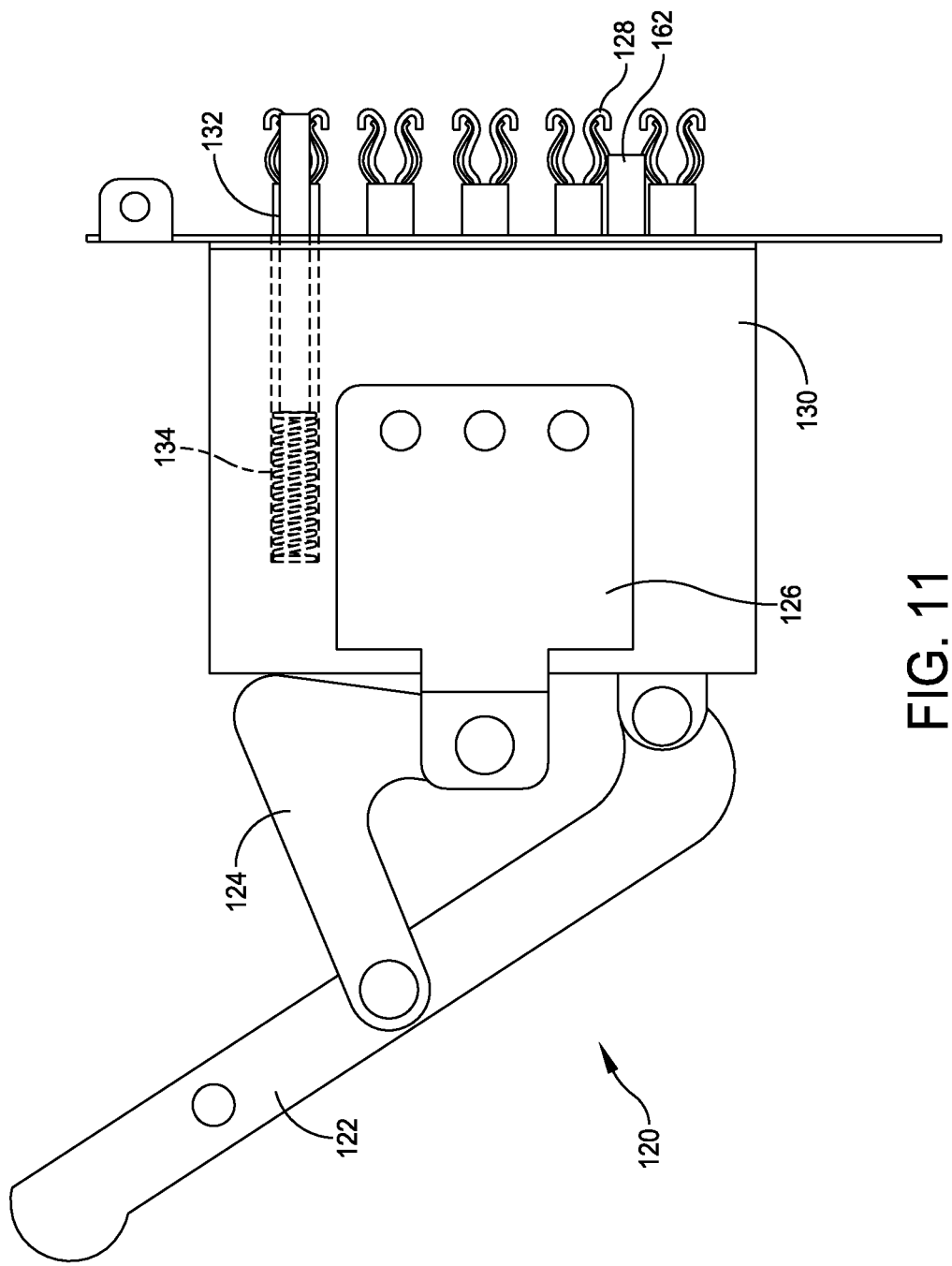
FIG. 11 is a schematic side view of a jaws movement mechanism of a plug-in unit of yet another embodiment of the present disclosure.

FIG. 11 illustrates a jaws movement mechanism, generally indicated at 120, of a plug-in unit of yet another embodiment of the present disclosure. As shown, the jaws movement mechanism 120 is substantially similar to jaw movement mechanism 100, and includes a lever 122, a lever link 124 and a lever fork 126, which together to drive the back-and-forth movement of movable jaws 128 provided within a guide housing 130. The arrangement is such that the jaws movement mechanism 120 is configured to move the jaws 128 between a retracted position and its shown extended position in which the lever 122 is moved clockwise to extend the jaws. The jaws movement mechanism 120 further includes two spring-loaded interlock pins 132 positioned in respective sleeves 134 provided in the guide housing 130 to prevent the contact of the jaws with the busbars when the plug-in unit is not secured or insufficiently secured to a busway, with one of the spring-loaded interlock pins being shown in an extended position in FIG. 11.

When the plug-in unit is hooked onto a top of the busway and the installer begins to rotate the plug-in unit into position, the spring-loaded interlock pins 132 contact an outer surface of the busway on both sides of a socket (on one side if only one pin is provided) before a top jaw of the jaws 128 extends toward the busbar. The pins 132 remain locked until the jaws 128 and the jaws movement mechanism 120 have been retracted and pressure has been removed from the pins. Thus, the spring loaded locking pins 132 interfere with the ability of the installer to secure the plug-in unit to the busway. As shown, the spring-loaded interlock pins 132 extend out a length the same length as the extended jaws 128.

In another embodiment, the spring-loaded locking pin 132 can be configured to move the movable jaws 128 when engaging the outer surface of the busway when securing the plug-in unit to the busway.

After the plug-in unit has been removed from the busway, and the lever 122 is rotated counterclockwise to retract the jaws 128, the plug-in unit is ready to be properly mounted on the busway. Once the jaws 128 are fully retracted, the spring-loaded locking pin 132 is unlocked.

Figure 12:
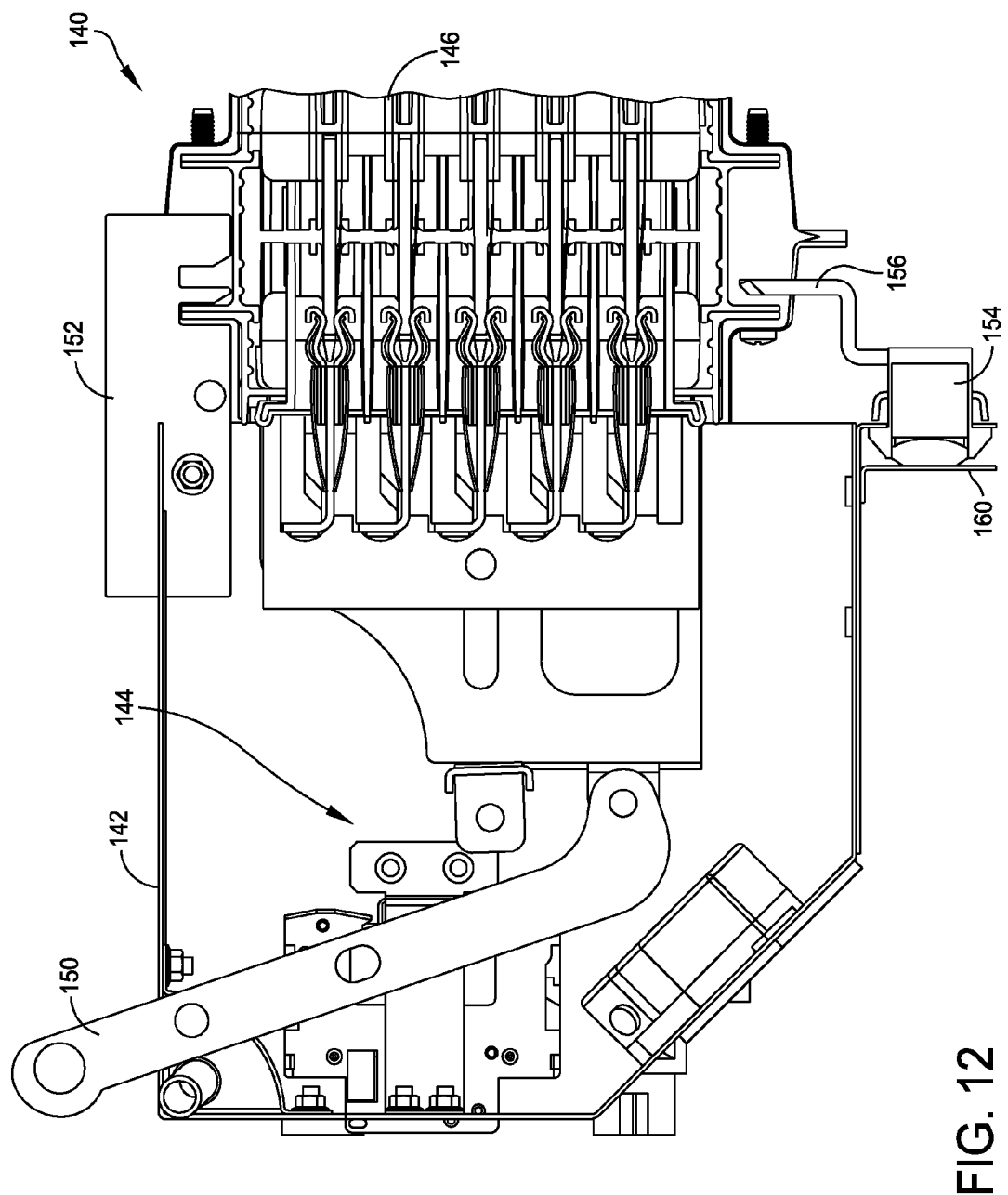
FIG. 12 is a cross-sectional view of a plug-in unit of another embodiment of the present disclosure showing a flap in a position in which the flap blocks a key lock of a handle of a pawl mechanism.
Figure 13:
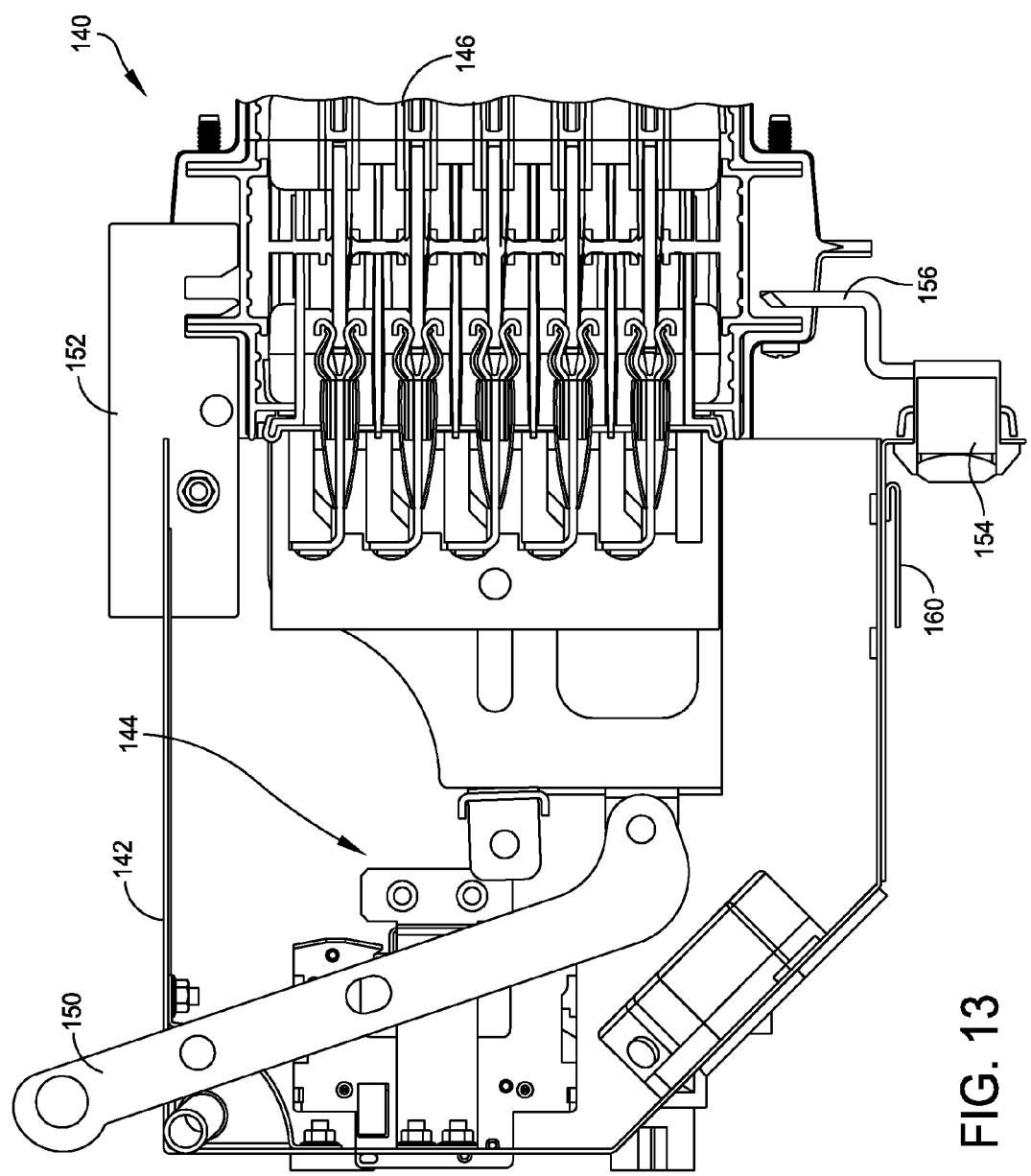
FIG. 13 is a cross-sectional view of the plug-in unit of FIG. 12 showing the flap in a position in which access to the key lock is enabled.
Figure 14:
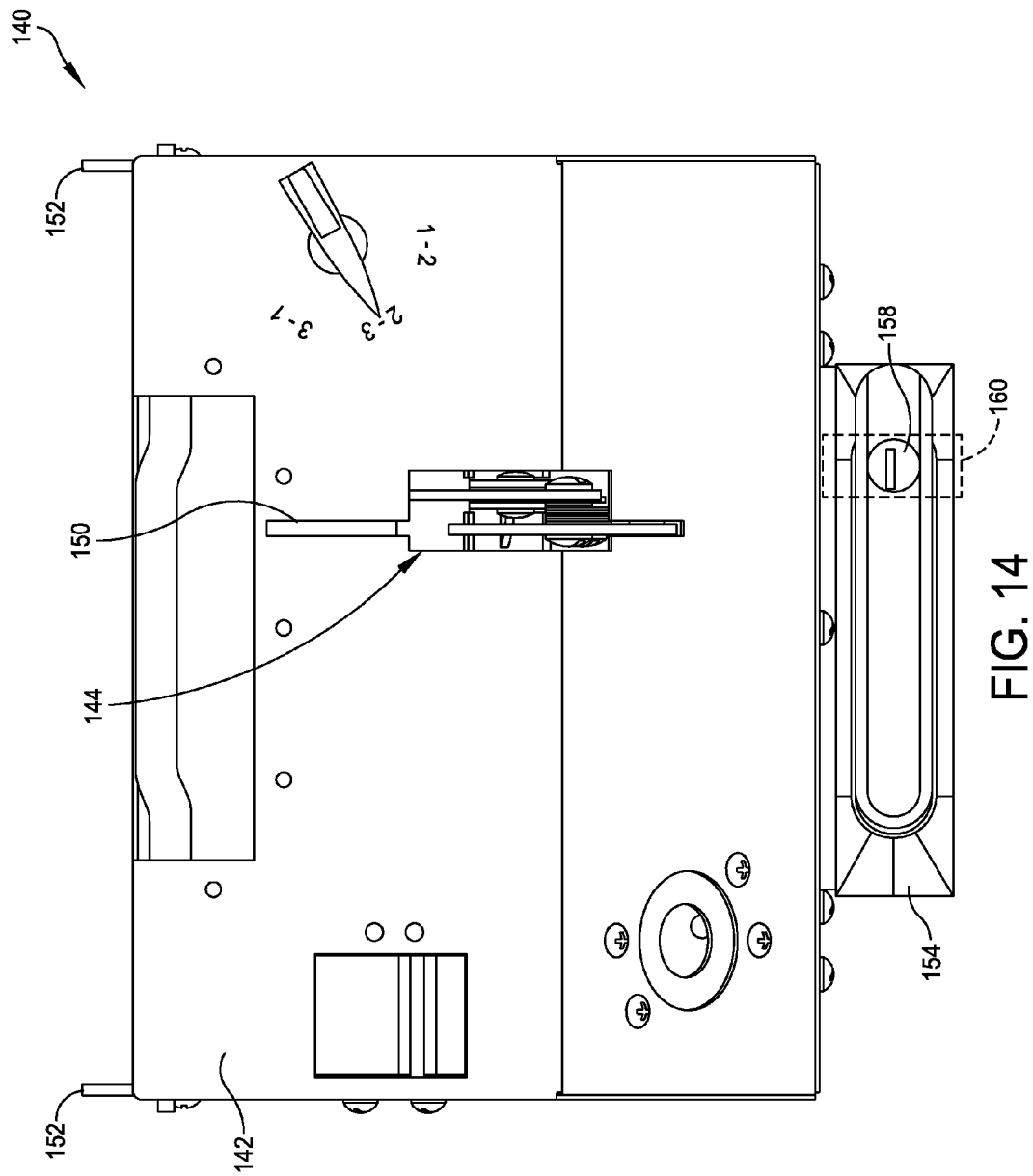
FIG. 14 is a front view of the plug-in unit of FIG. 12.

FIGS. 12-14 illustrate another yet another embodiment of the plug-in unit, which is generally indicated at 140. As shown, the plug in unit 140 includes a housing 142 and a jaws movement mechanism, generally indicated at 144, which is configured to drive the back-and-forth movement of movable jaws 146 provided within a guide housing. The arrangement is such that the jaws movement mechanism 144 is configured to move the jaws 146 between a retracted position and its shown extended position in which a lever 150 is moved clockwise to extend the jaws. In the shown embodiment, the plug-in unit 140 further includes a mechanical coupling assembly, which has two mounting brackets, each indicated at 152, secured to respective side walls of the housing 142 of the plug-in unit 140.

The mechanical coupling assembly further includes a handle 154 and a rotatable pawl 156 coupled to the handle provided at a bottom of the housing 142 to secure the bottom of the housing to the busway. In FIGS. 12 and 13, the rotatable pawl 156 is shown in a locked position in which the pawl is rotated to engage the busway and prevent the removal of the plug-in unit 140 from the busway. The rotatable pawl 156 is rotated by manipulation of a keyed lock 158 shown in FIG. 14, which is configured to secure the pawl in the locked position and to release the pawl to an unlocked position. A key may be provided to rotate the keyed lock 158 in a traditional manner.

The mechanical coupling assembly further includes a flap 160 that is movable between a first position (FIG. 12) in which the flap blocks the keyed lock 158 and a second position (FIG. 13) in which access to the keyed lock is enabled. The flap 160 is provided as a measure of protection to prevent access to the keyed lock 158 when the jaws 146 are engaged with busbars of the busway. In one embodiment, movement of the flap 160 can be tied to movement of the movable jaws 146. Specifically, the flap 160 can be configured to move from the first position to the second position when moving the jaws 146 by the jaws movement mechanism 144 from the extended position to the retracted position by rotating the lever in a counterclockwise direction.

In another embodiment, an alignment pin 162, secured to the jaws housing and extends from a back of the housing, is provided to guide the jaw assembly and the jaws into a proper area of the busway, by entering a corresponding opening in a socket of the busway when the plug-in unit is attached to the busway and rotated into position. The alignment pin ensures that the jaws contact the busbars properly when extended.

The lever may be configured to open up the phase(s) and/or neutral and/or ground, with sufficient current carrying capability, such as 100, 225, 400, or 600 amps. In some embodiments, multiple sizes of plug-in unit may be provided to mate with various busways. (Different sizes of the plug-in unit may be needed to accommodate the different thicknesses of the various busways.) Internal contacts of the lever can be rated for no-load switching, with required label on unit to indicate that the circuit breaker in the plug-in unit must be open ("off") before either opening or closing the lever. Also, the plug-in unit may be configured to receive 4-jaw or the shown 5-jaw configuration of the plug-in unit.

One method of operating the lever is to have a large handle on one or more surfaces (for example, sides or top/bottom).

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A plug-in unit configured to be coupled to a busway, the plug-in unit comprising:
    a housing configured to be secured to the busway;
    an electrical coupling assembly coupled to the housing and configured to move between an uncoupled position in which the plug-in unit is uncoupled to the busway and a coupled position in which the plug-in unit is electrically coupled to the busway; and
    an actuator assembly coupled to the housing and the electrical coupling assembly, the actuator assembly being configured to move the electrical coupling assembly between the uncoupled and coupled positions and to secure the plug-in unit to the housing.

2. The plug-in unit of claim 1, further comprising a spring-loaded pin configured to prevent the electrical coupling assembly from moving to the coupled position when the spring-loaded pin is extended.

3. The plug-in unit of claim 1, further comprising a mechanical coupling assembly coupled to the housing and configured to releasably secure the housing to the busway.

4. The plug-in unit of claim 3, wherein the mechanical coupling assembly includes a bracket configured to engage a top of the busway.

5. The plug-in unit of claim 1, wherein the actuator assembly includes a lever coupled to the housing and the electrical coupling assembly, the lever being movable between a first position in which the electrical coupling assembly is in the uncoupled position and a second position in which the electrical coupling assembly is in the coupled position.

6. The plug-in unit of claim 5, wherein the electrical coupling assembly includes jaws configured to engage the busway.

7. The plug-in unit of claim 6, wherein the jaws are coupled to the lever, the jaws being movable by the lever when moving the lever from the first position in which the jaws achieve a disengaged position associated with the uncoupled position of the electrical coupling assembly with the jaws being spaced from the busway to the second position in which the jaws achieve an engaged position associated with the coupled position of the electrical coupling assembly with the jaws engaging the busway.

8. The plug-in unit of claim 7, wherein the electrical coupling assembly includes a guide mounted on the housing and a jaws housing that is movably coupled to the guide, the jaws being mounted on the jaws housing.

9. The plug-in unit of claim 8, wherein the guide includes two side walls, each side wall having at least one slot formed therein to guide the movement of posts mounted on the jaws housing.

10. The plug-in unit of claim 8, wherein the actuator assembly further includes a lever fork coupled to the jaws housing, and a lever link coupled to the lever and the lever fork.

11. A plug-in unit configured to be coupled to a busway, the plug-in unit comprising:
    a housing configured to mate with the busway;
    a plug-in interface coupled to the housing, the plug-in interface being configured to receive a plug-in unit;
    means for electrically coupling the plug-in unit to the busway between an uncoupled position in which the plug-in interface is uncoupled to the busway and a coupled position in which the plug-in interface is electrically coupled to the busway; and means for actuating the movement of the electrical coupling means between the uncoupled and coupled positions.

12. The plug-in unit of claim 11, wherein the means for actuating the movement of the means for electrically coupling the plug-in unit to the busway includes a lever coupled to the housing and movable between a first position in which the lever is in the uncoupled position and a second position in which the lever is in the coupled position.

13. The plug-in unit of claim 12, wherein the means for electrical coupling includes jaws configured to engage the busway.

14. The plug-in unit of claim 13, wherein the jaws are coupled to the lever, the jaws being movable by the lever when moving the lever from the first position in which the jaws achieve a disengaged position associated with the uncoupled position of the electrical coupling assembly with the jaws being spaced from the busway to the second position in which the jaws achieve an engaged position associated with the coupled position of the electrical coupling assembly with the jaws engaging the busway.

15. The plug-in unit of claim 14, wherein the means for electrical coupling further includes a guide mounted on the housing and a jaws housing that is movably coupled to the guide, the jaws being mounted on the jaws housing.

16. The plug-in unit of claim 15, wherein the guide includes two side walls, each side wall having at least one slot formed therein to guide the movement of posts mounted on the jaws housing.

17. The plug-in unit of claim 15, wherein the means for actuating further includes a lever fork coupled to the jaws housing, and a lever link coupled to the lever and the lever fork.

* * * * *